United States Patent [19]
Taylor et al.

[11] 3,928,269
[45] Dec. 23, 1975

[54] ACID DYEABLE OLEFIN POLYMER CONTAINING QUATERNIZED AMINE GROUPS

[75] Inventors: Peter A. Taylor; Tsung-Yuan Su, both of Greenville, S.C.

[73] Assignee: Phillips Petroleum Company, Bartlesville, Okla.

[22] Filed: Sept. 9, 1974

[21] Appl. No.: 504,071

[52] U.S. Cl. ...... 260/23 AR; 260/86.7; 260/89.5 N; 260/45.8 N; 260/45.85; 260/49.95; 260/897 B; 8/180; 8/DIG. 9
[51] Int. Cl.² .................. C08L 23/08; C08L 23/14
[58] Field of Search .................. 260/897 B, 89.5 N

[56] References Cited
UNITED STATES PATENTS

| | | | |
|---|---|---|---|
| 3,395,198 | 7/1968 | Taniguchi et al. | 260/897 |
| 3,644,580 | 2/1972 | Craven | 260/878 |
| 3,823,204 | 7/1974 | Okada et al. | 260/898 |

FOREIGN PATENTS OR APPLICATIONS

| | | | |
|---|---|---|---|
| 211,734 | 1/1956 | Australia | 260/89.7 N |

*Primary Examiner*—Carman J. Seccuro

[57] ABSTRACT

An olefin polymer containing a minor amount of a copolymer of ethylene or propylene and an aminoalkyl acrylate is treated with an alkyl halide and thereafter dyed with an acid dye. This allows dying the polymer at a relatively high pH. Fibers may be treated prior to being formed into fabric or a finished fabric made at least in part of olefin polymer fiber containing the aminoalkyl acrylate copolymer can be treated.

21 Claims, No Drawings

ACID DYEABLE OLEFIN POLYMER CONTAINING QUATERNIZED AMINE GROUPS

BACKGROUND OF THE INVENTION

This invention relates to improving the dye receptivity of olefin polymers.

Olefin polymers have found widespread acceptance in recent years because of a combination of properties including light weight, high strength on orientation, and good chemical resistance. This latter property, however, tends to limit the extent to which one can take advantage of the inherent characteristic of these polymers to produce good fibers on stretching. It was early recognized that in order for olefin polymers to be useful in fabric applications some means would have to be devised to improve the dyeability. Various additives and treatments have been utilized with varying degrees of success to produce dyeable olefin polymers. Actually the fabric industry is a sophisticated highly competitive industry in which the question of acceptable dye receptivity is more than just a matter of whether it is possible in the laboratory to produce a dyed fiber. To be commercially feasible, a dye system must be sufficiently good that the fabric will affirmatively pick up the dye from the dye bath, frequently in competition with other materials. Also there are instances where it is necessary that the material be receptive to particular types of dyes such as acid dyes and/or dyeing at a particular pH because of other considerations. There is a particularly difficult problem with regard to dyeing olefin polymers with acid dyes at a pH approaching a neutral value, say for instance 6 or higher. This is true even in polymers containing conventional additives which may be dyeable to some extent with acid dyes at a pH of about 2.5. It has been found that acid dye sites provided by additives of the aminoalkyl acrylate type have an inherent tendency to become inactivated as dye sites when they are exposed to light.

SUMMARY OF THE INVENTION

It is an object of this invention to provide an olefin polymer having improved dye receptivity;

it is a further object of this invention to provide an olefin polymer susceptible to dyeing with acid dyes at a relatively high pH;

it is yet a further object of this invention to provide an olefin polymer which is capable of competing with other fabrics in a dye bath containing an acid dye;

it is yet a further object of this invention to avoid the tendency of some dye receptivity modifiers to lose effectiveness on exposure to light; and it is still yet a further object of this invention to provide a technique whereby a supported fabric capped with olefin fibers can be dyed in an acid dye to give a similar shade on both fabrics.

In accordance with this invention, olefin polymer containing a copolymer of ethylene or propylene and an aminoalkyl acrylate is treated with an alkyl halide to give an acid dyeable material.

DESCRIPTION OF THE PREFERRED EMBODIMENTS

The olefin polymers to which the invention applies are normally solid polymers prepared by polymerizing at least one aliphatic mono-1-olefin containing 2 to 8 carbon atoms per molecule. Exemplary compounds include polyethylene, polypropylene, ethylene/propylene copolymers, ethylene/1-hexene copolymers, and ethylene/1-octene copolymers. The preferred material is substantially crystalline polypropylene prepared by the stereospecific polymerization of propylene over such catalyst systems as $TiCl_3 \cdot 1/3\ AlCl_3$ and diethylaluminum chloride. This polymer exhibits an optically determined melting point of about 340°F and can have melt flows ranging from about 0.1 to about 20 or more as determined by ASTM D1238-62T, Condition L.

The acid dyeable olefin polymer compositions of the invention may contain other additives such as a carboxylic acid metal salt to further improve dyeability; an antioxidant, for instance a hindered phenol, and a diester of a thiodipropionic acid to impart oxidative stability; a UV stabilizer to give resistance against the deleterious effects of UV radiation; and a fatty acid salt such as calcium stearate to improve processability.

The carboxylic acid metal salt can be a metal salt of carboxylic acid which contains 4 to 18 carbon atoms. Suitable carboxylic acids are benzoic acid, p-t-butylbenzoic acid, phenylacetic acid, mellitic acid, 1,8-naphthalic acid, o-phthalic acid, 1,2-cyclohexanedicarboxylic acid, adipic acid, succinic acid, camphoric acid, stearic acid, and the like. Preferred metals are those of Group IA and Group IIIA of the Periodic Table. It is preferred that the metal salt be finely divided for best results. For example, it is desirable that the salt can pass through a 100 mesh screen or finer, i.e., 325 mesh screen. Examples of suitable metal salts include sodium benzoate, potassium benzoate, lithium benzoate, sodium stearate, potassium adipate, lithium phenylacetate, aluminum hydroxy p-t-butylbenzoate, and the like. The carboxylic acid metal salt can be employed in an amount up to about 3 weight percent based upon the polyolefin content of the polymeric blend although amounts within the range of from about 0.25 to 1 weight per cent are preferred.

Olefin polymers, and especially polypropylene, require protection against thermal and oxidative degradation and hindered phenolic antioxidants such as Irganox 858, 1010, 1076, and 1093 are excellent for this purpose. These materials are manufactured by the Geigy Chemical Corporation, and are, respectively, 2,4-bis(4-hydroxy-3,5-di-t-butylphenoxy)6-(n-octylthio)-1,3,5-triazine, tetrakis [methylene(3,5-di-t-butyl-4-hydroxyhydrocinnamate)] methane, octadecyl [3-(3,5-di-t-butyl-4-hydroxyphenyl)] propionate and di-n-octadecyl (3,5-di-t-butyl-4-hydroxybenzyl) phosphonate. These antioxidants are particularly effective because of their low volatility and long term beneficial effects. Other hindered phenols such as BHT(2,6-di-t-butyl-4-methylphenol), Ethyl 330 (Ethyl Corp.), 1,3,5-trimethyl-2,4,6-tris (3,5-di-t-butyl-4-hydroxybenzyl) benzene can also be used. These primary antioxidants are generally used in amounts ranging from about 0.005 to about 1 weight percent, based on total composition, and more preferably from about 0.02 to about 0.5 weight percent.

A second antioxidant to supplement or augment the effectiveness of the primary one is generally used in polypropylene formulations. A particularly effective class of such compounds are the diesters of beta, beta'-dithiopropionic acid. Especially preferred for this purpose are dilaurylthiodipropionate (DLTDP) and distearylthiodipropionate (DSTDP). These compounds are used in amounts ranging from about 0.02 to about 3 weight percent, based on total composition, and more preferably from 0.05 to about 1.5 weight percent.

A UV stabilizer may be required to impart light stability and dye light-fastness to the compositions. The hydroxybenzotriazoles are effective when used for this purpose. These compounds are represented by the following generic formula:

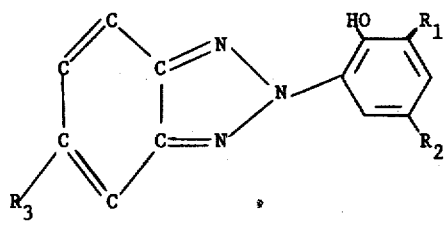

in which $R_1$ and $R_2$ can be hydrogen or an alkyl group containing from 1 to 12 carbon atoms with at least one $R_1$ or $R_2$ being an alkyl group and $R_3$ is a halogen such as chlorine or hydrogen. Particularly preferred is the combination wherein $R_1$ and $R_2$ are tertiary amyl groups and $R_3$ is hydrogen. This compound is 2(2'-hydroxy-3',5'-di-t-amylphenyl) benzotriazole (Tinuvin 328). The UV stabilizer is used in amounts ranging from about 0.1 to about 2 weight percent, based on total composition, and more preferably from about 0.25 to 1.5 weight percent.

A processing aid is generally used in preparing fibers from polypropylene compositions. This material is a fatty acid salt, preferably an alkaline earth metal stearate, most preferably calcium stearate. These compounds are used in amounts ranging from about 0.005 to about 2 weight percent, based on total composition, and more preferably from about 0.02 to about 0.5 weight percent.

The dye receptive agent utilized in accordance with this invention is a copolymer of ethylene or propylene and an aminoalkyl acrylate. The aminoalkyl acrylate which is reacted with the ethylene or propylene to produce these copolymers has the formula

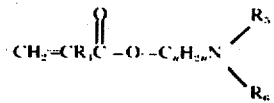

wherein $R_4$ is hydrogen or a methyl radical, $R_5$ and $R_6$ are hydrogen or alkyl radicals having 1–4 carbon atoms and n is an integer of 1 to 4. Preferred are ethylene and aminoalkyl acrylate copolymers of the type described in Taniguchi et al, U.S. Pat. No. 3,395,198, issued July 20, 1968, the disclosure of which is hereby incorporated by reference. Ethylene/aminoalkyl acrylates are preferred. More preferred as the acrylates are the alkylaminoalkyl methacrylates. The most preferred copolymer is an ethylene/N,N-dimethylaminoethyl methacrylate copolymer consisting of about 13 units of ethylene per unit of dimethylaminoethyl methacrylate.

The dye receptor and the other additives, if any, are admixed with the base olefin polymer using conventional apparatus such as Banbury mixers, roll mills, compounding extruders and the like. Generally, the resulting mixtures are pelletized for convenience in handling prior to their subsequent conversion into fibers or films. The fibers are normally prepared by melt spinning techniques and are usually oriented before processing into staple, fabrics, and the like. The films are normally prepared by extrusion and can be either oriented or unoriented. The treatment with the alkyl halide can be practiced on material containing the acrylate either in the form of fibers or film or in the form of yarns or fabrics prepared from fibers and films.

The alkyl halide treating agent is any alkyl halide containing from 1 to 8 carbon atoms per molecule. Exemplary halides include methyl chloride, methyl bromide, methyl iodide, ethyl chloride, n-propyl bromide, n-hexyl iodide and sec-octyl chloride, and the like. Methyl bromide is the preferred treating agent.

Time of treatment is dependent on how readily the alkyl halide contacts the fiber and fabric surfaces to effect quaternization of reactive nitrogen atoms in the dye receptor molecules. Contact times ranging from about 10 minutes to 100 hours or more have been found to be effective. Contact can be effected in the vapor or liquid phase. Under liquid phase conditions the alkyl halide can be used alone or in combination with a suitable organic solvent such as acetone, methanol, n-hexane, halogenated hydrocarbons and the like which can be used in the presence of wetting agents compatible with the liquid mixture. The treated material is preferably dried before the dyeing operation.

Treating temperatures can vary depending upon the particular halide used and whether gas phase or liquid phase conditions are employed. Generally temperatures in the range of 0°F to about 300°F can be employed. Good results have been obtained at temperatures ranging from about 68°F to about 135°F.

The quantity of alkyl halide in the treating process can range from about 0.8 to about 10, preferably 0.8 to 2, times the amount calculated to react with the dye sites in the dye receptor. Good results have been obtained using above about one times the stoichiometric quantity. For example with 7 weight percent of an ethylene/N,N-dimethylaminoethyl methacrylate copolymer having a ratio of ethylene units per dimethylaminoethyl methacrylate units of 13 to 1, about 1.5 weight percent methyl bromide corresponding to about 1.2 times stoichiometric is adequate. Obviously this will vary greatly dependng on the molecular weight of the dye receptor and the molecular weight of the alkyl halide.

The amount of amino alkyl acrylate dye receptor admixed with the polyolefin is preferably at least 5.5 weight percent based on the total weight of the composition with improvement leveling out at between 6 and 7 percent. Thus while greater than 7 percent can be utilized, there is no particular advantage and it is desirable to utilize the least amount possible so as to avoid adversely affecting other properties of the polymer. As little as 3 percent of the amino alkyl acrylate dye receptor effects some improvement, thus 3 to 10, preferably 5 to 7 weight percent based on the weight of olefin polymer plus additives can be used.

The amino acrylate dye receptor can vary considerably from the preferred 13 to 1 ratio of ethylene or propylene units to acrylate units so long as it remains a normally solid thermoplastic polymer. Generally the mole ratio of ethylene or propylene units to aminoalkyl acrylate units will be within the range of 1:1 to 100:1, preferably 10:1 to 20:1, more preferably 12:1 to 14:1. Molecular weight will generally be sufficient to give an intrinsic viscosity of 0.1 to 4.0 dl/g measured in tetralin solution at 130°C.

Preferred compositions to be treated in accordance with this invention are those having (a) 90-93 weight percent polypropylene (b) 6 to 8 percent of an ethylene or propylene/aminoalkyl acrylate, preferably an ethylene/N,N-dimethylaminoethyl methacrylate copolymer, (c) 0.25 to 1 weight percent of a carboxylic acid metal salt, (d) 0.005 to 1 weight percent of a hindered phenol antioxidant, (e) 0.02 to 3 weight percent of a diester of beta, beta'-dithiopropionic acid, (f) 0.005 to 2 weight percent of an alkaline earth metal stearate processing aid, and (g) 0.1 to 2 weight percent of a hydroxybenzothiazole as a UV stabilizer.

EXAMPLE I

In this and subsequent examples, the acid dyeable polymer utilized consisted of 91.7 weight percent polypropylene, 7.0 weight percent of the ethylene/N,N-dimethylaminoethyl methacrylate copolymer having a mole ratio of ethylene/acrylate units of 13 to 1, 0.2 weight percent distearylthiodipropionate, 0.5 weight percent sodium benzoate, 0.5 weight percent 2(2'-hydroxy-3',5'-di-t-amylphenyl) benzotriazole (Tinuvin 328, a UV stabilizer), 0.05 weight percent calcium stearate, and 0.05 weight percent tetrakis [methylene (3,5-di-t-butyl-4-hydroxyhydrocinnamate)] methane. For convenience this composition is referred to as ADPP (acid dyeable polypropylene).

Ten gram samples of ADPP staple and a ten gram sample of textured ADPP (skein, about 15 dpf) were individually placed in vessels along with 150 ml of 0.1 molar methyl iodide in acetone and allowed to stand for 62 hours at room temperature. Similar samples of the ADPP were treated similarly with just acetone. After removing the samples and drying them the samples were competitively dyed with a knitted nylon-6,6 piece at pH 6.0 with 0.5 percent owf Merpacyl Blue 2 GA acid dye (C.I. no. 62125). The shade each sample was dyed was visually rated as light, medium or dark. The results are presented in Table I.

TABLE I

| Run No. | Sample Description | Methyl Iodide Treatment | Sample Color |
|---|---|---|---|
| 1 | 3 dpf ADPP staple | no | not dyed |
| 2 | 3 dpf ADPP staple | yes | light |
| 3 | 6 dpf ADPP staple | no | not dyed |
| 4 | 6 dpf ADPP staple | yes | medium |
| 5 | 15 dpf ADPP skein | no | not dyed |
| 6 | 15 dpf ADPP skein | yes | deep |
| 7* | 15 dpf ADPP skein | yes | deep |
| 8 | 15 dpf nylon-6,6 knit | no | medium |

*Treated 27 hours in 0.1 molar methyl iodide solution.

The results show that methyl iodide treated ADPP dyes at pH 6.0 with acid dyes but not in the absence of the treating agent. The results also show that the 6 dpf ADPP staple dyed to about the same shade as the polyamide knitted cloth. The 15 dpf ADPP skein dyed to deep shades after treating times of 27 and 62 hours, respectively.

EXAMPLE II

ADPP staple (6 dpf) was treated with 0.08 molar methyl iodide in acetone for 69 hours at room temperature. The quantity of methyl iodide used was six times the stoichiometric amount calculated to react with the dye sites contained in the staple. After removing the staple and drying, the quaternized staple as a carded web was applied on a 2.3 oz/square yard Loktuft (Trademark for nonwoven fabric frequently used as a carpet backing) substrate at an amount equivalent to 1.9 oz/square yard and needled into the substrate. The Loktuft fabric was prepared from a 3 dpf polypropylene web. A portion of the composite was partially fused on each side by passing the web through two rolls heated to between about 300°–325°F. A composite of ADPP fibers applied to a web of ADPP was also made from methyl iodide treated fibers. The composite was partially fused through two heated rolls as before. Each sample was competitively dyed in the presence of a nylon-6,6 cap coated Loktuft fabric at pH 6.0 with 0.5 percent owf Merpacyl Blue 2 GA. The results are presented in Table II. K/S was used to measure the color intensity at the wave length specified and is related to reflectance as measured on an equipment such as a Color Eye (manufactured by the Instrument Development Laboratory Division, Kollmorgan Corporation) by the formula: $K/S = (1 - R)^2/2R$ where $R$ = the fractional reflectance. The higher K/S color values indicate the greater dyeability.

TABLE II

| Run No. | Sample Description | Dyeing Results K/S at 620 mμ |
|---|---|---|
| 1 | ADPP cap coated Loktuft fabric, no fusing | 8.75 |
| 2 | ADPP cap coated Loktuft fabric, some fusing | 8.49 |
| 3 | ADPP cap coated on ADPP Loktuft fabric some fusing | 9.37 |
| 4 | nylon-6,6 cap coated Loktuft fabric | 7.40 |

The results show the alkyl halide treated ADPP cap coated on a polypropylene substrate dyes to a similar shade as a nylon-6,6 cap coated polypropylene substrate at a pH of 6.0 with an acid dye.

EXAMPLE III

ADPP containing 7 percent of the dyeable additive copolymer was converted into 6 dpf × 4" staple and the staple was cap coated on polypropylene carpet backing. The composite was competitively dyed with nylon 846 at boil for 1 hour using 1 percent of Merpacyl Blue 2 GA at pH 6.0 and 2.4. In the invention, $CH_3Br$ gas was gently bubbled through the dye bath held at pH6 during the entire dyeing operation. In the control runs, no $CH_3Br$ gas was used. Formic acid was used to adjust pH of the baths. The results are given in Table III.

TABLE III

| Sample Comp. | Run No. | $CH_3Br$ Present | Dye Bath pH Before | Dye Bath pH After | K/S at 620 ADPP Composite |
|---|---|---|---|---|---|
| ADPP composite | 1 | no | 2.4 | 2.5 | 1.92 |
| ADPP composite | 2 | no | 6.0 | 7.3 | did not dye |
| ADPP composite | 3 | yes | 6.0 | 2.4 | 2.97 |

Runs 1 and 2 show that the ADPP composite is capable of accepting dye to a slight extent at a low pH but not at pH 6.0. Run 3 shows that the ADPP composite has improved capability of accepting acid dyes when $CH_3Br$ is present in the dye bath although this is a less preferred embodiment of the invention.

EXAMPLE IV

Two samples of ADPP staple cap coated on 2 oz./square yard Loktuft fabric were prepared as described in Example 2. In sample one a web of ADPP weighing 2 oz/square yard was applied to the substrate and in sample two a web of ADPP weighing 3 oz/square yard was applied to the substrate. The composites were partially fused as before. A 4.2 gram portion was cut from sample one and divided into two pieces 1a and 1b and a 4.9 gram portion was cut from sample 2 and divided into two pieces 2a and 2b. One piece (a) from each sample was rolled into a tight roll and inserted in a glass tube open at each end, the tubes then being vertically suspended in a closed container adapted for refluxing. One piece (b) from each sample was freely suspended in the vessel also. A small quantity of methyl iodide, 3.23 grams was placed in the vessel and the vessel heated for 2 hours at a temperature ranging from 42°-56°C. Thus, each sample was treated in the vapor phase with the alkyl halide during the contacting period. After the treatment, the methyl iodide vapors were flushed from the vessel and contained samples and the samples were dyed at pH 6.0 with 1 percent owf Merpacyl Blue 2 GA. The results are presented in Table IV.

TABLE IV

| Run No. | Sample Form During Treatment | Dyeing Results K/S at 620 |
|---|---|---|
| 1a | rolled | 7.50 |
| 1b | loose | 7.96 |
| 2a | rolled | 7.96 |
| 2b | loose | 8.29 |

The results show that treatment of ADPP fibers with alkyl halide vapors alone improves the receptivity of the fibers to acid dyes at pH 6.0. Rolled up samples are dyed almost as deeply as fully exposed samples indicating the treatment can be expected to work for fabrics, yarns, and composites containing ADPP.

EXAMPLE V

To demonstrate the ability of alkyl halides to uniformly penetrate a commercial roll of acid dyeable Loktuft to give a product within the scope of this invention, a commercial roll of Loktuft carpet backing was prepared by laying 2 ounces per square yard of 6 denier acid dyeable polypropylene fiber of the formulation described in Example 1 onto a web of 2 ounces per square yard 3 denier polypropylene fiber with no acid dye sites introduced and processing these two webs to Loktuft carpet backing as described in U.S. Pat. No. 3,576,687. This Loktuft carpet backing was made into a roll 30 inches in diameter and 36 inches long. After sealing the ends to prevent the diffusion of alkyl halide through the ends, it was placed in an autoclave which was evacuated to about 2 inches mercury absolute pressure. Methyl bromide vapor was introduced to give a pressure of about 500 millimeters of mercury and allowed to stand in contact with the Loktuft carpet backing for about 30 minutes. After this treatment the excess methyl bromide vapor was exhausted and the system flushed with a stream of air to remove residual and dissolved methyl bromide before removing the roll from the autoclave.

The roll was found to be uniformly dyeable throughout and fully capable of being dyed at pH 6 to similar shades to nylon carpet yarn dyed competitively with it. It was thereby demonstrated that the methyl bromide was capable of penetrating a fabric such as a commercial roll of Loktuft nonwoven carpet backing.

EXAMPLE VI

Six denier by 4 inch fibers were prepared from a polypropylene composition similar to that described in Example I and baled. Similar fibers were prepared from the composition in Example I except that the sodium benzoate and Tinuvin 328 were eliminated from the formulation. Bales of fiber having a bulk density of about 17 pounds per cubic foot were prepared. These bales were treated with methyl bromide vapor in an evacuated autoclave such that the quantity of methyl bromide added was equivalent to the sum of 1.3 weight percent of the fiber and the amount of methyl bromide theoretically necessary to produce an excess partial pressure of 30 millimeters of mercury in the autoclave above the 1.3 weight percent introduced. Treatment time was about 12 hours after which the excess methyl bromide was exhausted from the vessel and the last trace removed using a stream of air.

Fiber from these bales was converted to acid dyeable Loktuft carpet backing according to U.S. Pat. No. 3,576,687. The products from each composition were found to be deeply dyeable with acid dyes when the dyeing was carried out at pH 6. When the products were tufted with Nylon 66 BCF carpet yarn and the resulting carpet dyed at pH 6 with 1 percent Merpacyl Blue 2GA, then the Loktuft carpet backing was dyed to a similar shade as the nylon face yarn and no backing grin-through could be seen.

EXAMPLE VII

Loktuft carpet backing, made as described in Example V, was exposed in a Xenon Arc Fadeometer for times up to 200 standard fading hours then dyed with 2 percent Merpacyl Blue 2GA (based on the weight of fiber) at pH 6. There was insignificant loss of dyeability due to the exposure, whereas when the Loktuft carpet backing was first exposed in the Xenon Arc Fadeometer and after exposure it was treated with methyl bromide, the samples exposed more than 60 hours were significantly less dyeable than the samples exposed for less time. Thus, surprisingly, treatment with methyl bromide reduces the tendency of the dye sites provided by the aminoalkyl acrylate to become inactivated as dye sites when they are exposed to light. Thus the compositions of this invention are more attractive in use because storage under light will not tend to reduce the dyeability.

To summarize, the alkyl halide treatment can be utilized in liquid phase or vapor phase. Fibers can be treated prior to, during or after conversion into fabrics, composites, carpets and the like. Fibers can be treated in compacted bales, if desired.

It is theorized that with the invention the nitrogen is converted to a quaternary nitrogen as follows:

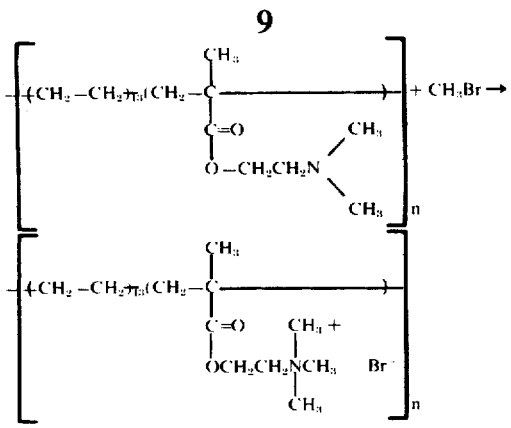

CONTROL I

The ADPP of the Examples was treated with hydrochloric acid and with 90 percent formic acid and acid dyed at a pH of 6. Both samples failed to give a deep shade. This distinguishes the instant invention which produces a composition which is acid dyeable at a relatively high pH from conventional treatments which are only effective when the dying is carried out at a lower pH.

While this invention has been described in detail for the purpose of illustration, it is not to be construed as limited thereby but is intended to cover all changes and modifications within the spirit and scope thereof.

What is claimed is:

1. An acid dyeable composition produced by treating a polymer composition comprising a polymer of at least one aliphatic mono-1-olefin having 2 to 8 carbon atoms per molecule, and as a dye receptor, a copolymer of ethylene or propylene and an aminoalkyl acrylate with a alkyl halide under conditions such that the alkyl halide reacts with dye sites in said dye receptor so as to obtain a composition susceptible to dyeing with acid dyes at a relatively high pH.

2. A composition according to claim 1 wherein said copolymer is a copolymer of ethylene and an alkylaminoalkyl methacrylate.

3. A composition according to claim 1 wherein said acrylate copolymer is present in an amount within the range of 3 to 10 weight percent based on the weight of said polymer composition, wherein said acrylate copolymer has a molar ratio of ethylene or propylene to aminoalkyl acrylate within the range of 10:1 to 20:1 and wherein said alkyl halide is used in an amount within the range of 0.8 to 10 times a stoichiometric amount needed to react with dye sites in said acrylate copolymer.

4. A composition according to claim 2 wherein said alkylaminoalkyl methacrylate copolymer has a molar ratio of ethylene to alkylaminoalkyl methacrylate within the range of 10:1 to 20:1.

5. A composition according to claim 2 wherein said treating agent is a methyl halide.

6. A composition according to claim 5 wherein said methyl halide is methyl iodide or methyl bromide.

7. A composition according to claim 6 wherein said alkylaminoalkyl methacrylate copolymer is an ethylene/N,N-dimethylaminoethyl methacrylate copolymer.

8. A composition according to claim 7 wherein a molar ratio of said ethylene to said N,N-dimethylaminoethyl methacrylate is 13:1.

9. A composition according to claim 8 wherein said methyl halide is used in an amount within the range of 0.8 to 10 times the stoichiometric amount needed to react with dye sites in said N,N-dimethylaminoalkyl methacrylate copolymer.

10. A composition according to claim 2 wherein said alkylaminoalkyl methacrylate copolymer is an ethylene/N,N-dimethylaminoethyl methacrylate copolymer.

11. A composition according to claim 2 wherein said alkyl halide is a methyl halide and wherein said methyl halide is present in an amount within the range of 0.8 to 2 times the stoichiometric amount required to react with dye sites in said ethylene/alkylaminoalkyl methacrylate copolymer.

12. A composition according to claim 2 wherein said composition contains in addition a carboxylic acid metal salt.

13. A composition according to claim 12 wherein said carboxylic acid metal salt is sodium benzoate.

14. A composition according to claim 2 which, prior to said treating consists essentially of
a. 90–93 weight percent polypropylene
b. 6 to 8 weight percent of an ethylene/N,N-dimethylaminoethyl methacrylate copolymer,
c. 0.25 to 1 weight percent of a carboxylic metal salt,
d. 0.005 to 1 weight percent of a hindered phenol antioxidant,
e. 0.02 to 3 weight percent of a diester of beta,beta'-dithiopropionic acid,
f. 0.005 to 2 weight percent of an alkaline earth metal stearate processing aid, and
g. 0.1 to 2 weight percent of a hydroxybenzothiazole as a UV stabilizer.

15. A composition according to claim 2 wherein said polymer composition is in the form of a fabric when subjected to said treating with said alkyl halide.

16. A process comprising: treating a polymer composition comprising a polymer consisting essentially of at least one aliphatic mono-1-olefin having 2–8 carbon atoms per molecule and as a dye receptor a copolymer of ethylene or propylene and an aminoalkyl acrylate with an alkyl halide under conditions such that the alkyl halide reacts with dye sites in said dye receptor so as to obtain a composition susceptible to dyeing with acid dyes at relatively high pH.

17. A process according to claim 16 wherein said acrylate is an alkylaminoalkyl methacrylate.

18. A process according to claim 17 wherein said copolymer is an ethylene/N,N-dimethylaminoethyl methacrylate copolymer.

19. A process according to claim 18 wherein said polymer having said copolymer incorporated therein is in the form of a fiber.

20. A process according to claim 18 wherein said polymer having said copolymer incorporated therein is in the form of a fabric.

21. A process according to claim 18 wherein said polymer having said copolymer incorporated therein is in the form of a bale of nonwoven carpet backing.

* * * * *